Sept. 23, 1969   J. R. STERRETT ET AL   3,468,609
LASER GRATING INTERFEROMETER
Filed April 26, 1966   2 Sheets-Sheet 1

INVENTORS
JAMES R. STERRETT
JAMES C. EMERY
JOHN B. BARBER
BY
ATTORNEYS

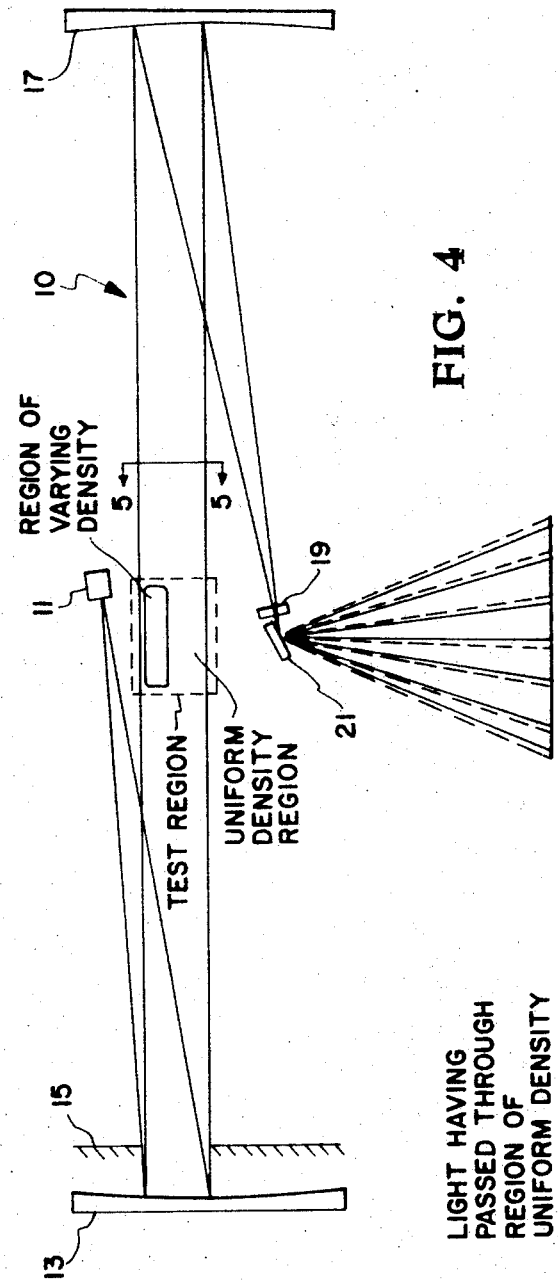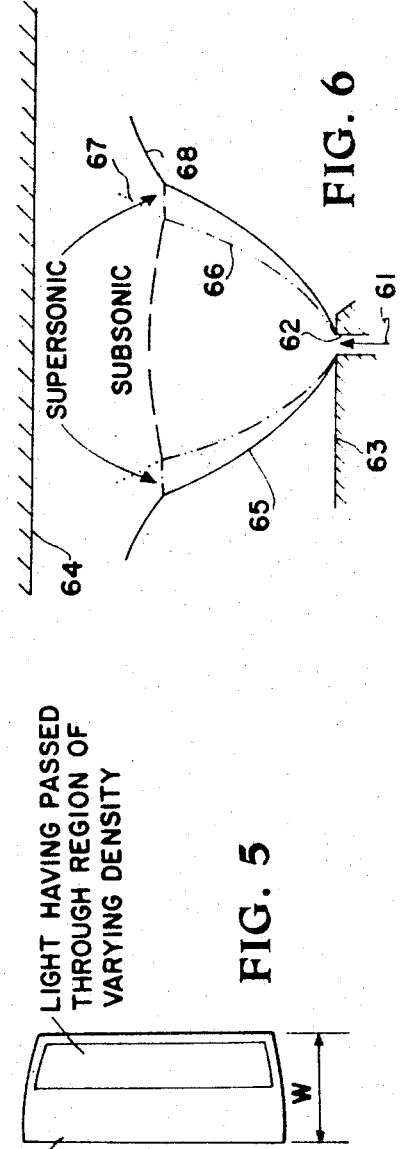

United States Patent Office 3,468,609
Patented Sept. 23, 1969

3,468,609
LASER GRATING INTERFEROMETER
James R. Sterrett and James C. Emery, Hampton, and John B. Barber, Newport News, Va., assignors to the United States of America as represented by the Administrator of the National Aeronautics and Space Administration
Filed Apr. 26, 1966, Ser. No. 546,149
Int. Cl. G01b 9/02; G01n 21/46
U.S. Cl. 356—107      6 Claims This invention was made by employees of the United States Government and may be manufactured or used by or for the Government without the payment of any royalties thereon or therefor.

This invention relates to optical apparatus based on the interference of light beams and relates in particular to an improved optical interferometer employing a laser light source for use in schlieren systems and the like.

The use of interferograms in fluid mechanics research has proved a valuable research tool in determining quantitatively and qualitatively the density patterns of compressible fluid flow. In addition, optical interferometers have been used to measure or reveal the fine details of fine optical homogeneity, including optical path differences that result from both surface effects and changes of index through a specific element. Interferometer schemes such as the Mach-Zehnder and Michelson interferometers, as well as pressure and temperature probes have been employed in the past to accomplish these tests. Although these known systems have proved quite adequate for the purposes intended, the complexities inherent therein as well as the need for laborious and time-consuming adjustments diminishes their practically for use in schlieren systems as employed in high speed tunnel testing, and other fluid mechanics research.

The present invention attempts to combine the advantageous features of these known prior art fluid mechanics research tools while eliminating or diminishing the disadvantages thereof.

Accordingly, an object of the present invention is to provide a new and improved interferometer.

Another object of the present invention is a simple, low-cost interferometer which is easy to build and adjust as a conventional schlieren system.

A further object of the present invention is a novel interferometer for use in fluid mechanics research.

Another object of the present invention is an interferometer using a small diffraction grating to combine the light on one side of the usual schlieren beam with that on the other side.

Yet another object of the present invention is an interferometer in which light beams are not divided and then recombined as is necessary for prior art interferometers.

In accordance with the present invention the foregoing and other objects are obtained by providing an interferometer employing a continuous wave gas laser light source, with diversion light from the laser source being collected by a mirror after part of the light is cut off by a stop. The mirror reflects the light received to a second mirror which refocuses the light waves onto a diffraction grating placed near the image of the light source. The diffraction grating breaks the light beam into a series of detectable diffracted beams or orders. An image formed by the overlapping of any two adjacent orders may then be analyzed quantitatively and qualitatively to determine the density patterns of compressible fluid flow. Thus, the present invention involves a simple laser grating interferometer which employs a laser light source in combination with a diffraction grating to cause mixing of disturbed and undisturbed light rays to thereby create readily detectable interference fringe patterns and form meaningful interferograms for use in high speed fluid mechanics research.

A more complete appreciation of the invention and many of the attendant advantages thereof will be readily apparent as the same becomes better understood by reference to the following detailed description when considered in connection with the accompanying drawings wherein:

FIG. 4 is a diagrammatic representation of the interferometer system of the present invention with the light beam passing through a test region containing a disturbance;

FIG. 5 is a diagrammatic section of the light when viewed along lines 5—5 of FIG. 4; and, FIG. 6 is a schematic representation of an interferogram obtained when employing the present invention in observing supersonic jet flow against a flat plate.

Figure 1:
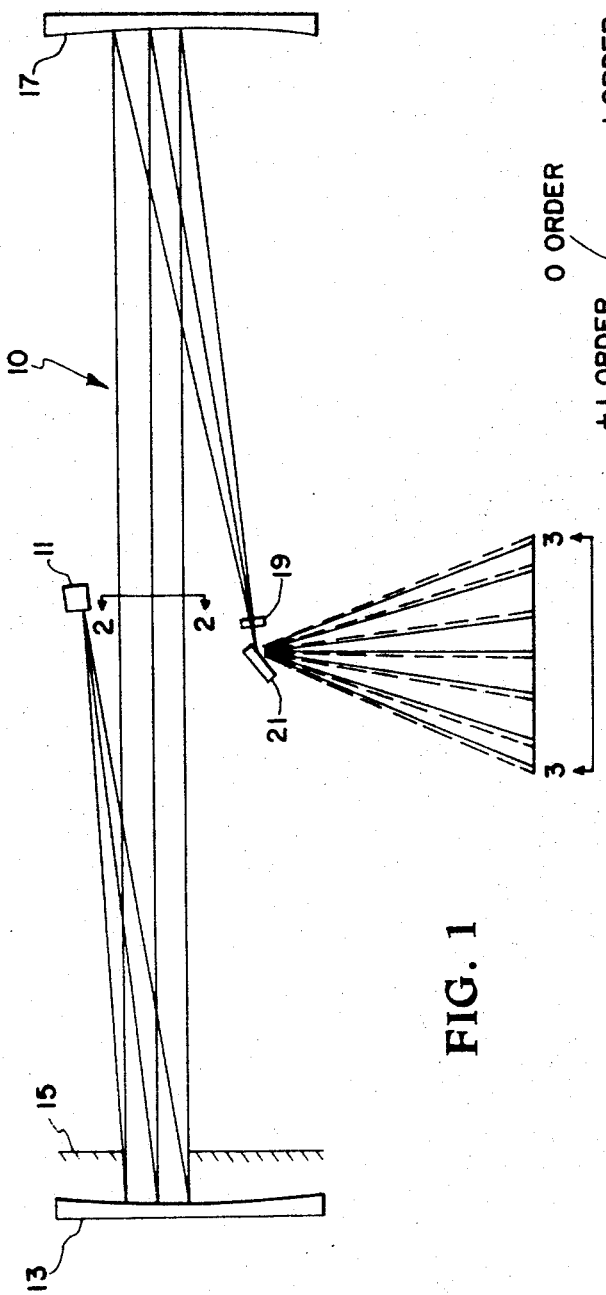
FIG. 1 is a diagrammatic section of the interferometer system of the present invention.

Referring now to the drawings, wherein like reference numerals designate like or corresponding parts throughout the several views, and more particularly to FIG. 1, there is shown an interferometer systems according to the present invention generally designated by reference numeral 10. Interferometer 10 employs a monochromatic and coherent small source size of light from a laser, such for example a commercially available gas laser emitting light continuously with a wavelength of 6328 angstroms, and as designated by reference numeral 11 in the drawing. Divergent light from laser 11 is collected by a mirror 13 after part of the light is cut off by stop 15 as shown in the figure. The width of the light beams reflected by mirror 13, W, should be approximately $$W = 2f \tan \theta$$

where the value of $\theta$ is obtained from the grating equation $$\theta = \sin^{-1}(\lambda/d)$$

and where $f$ = focal length of mirror 13
$d$ = grating constant of grating 19, i.e., width of rulings
$\lambda$ = wavelength in a vacuum of light from laser 11.

Figure 3:
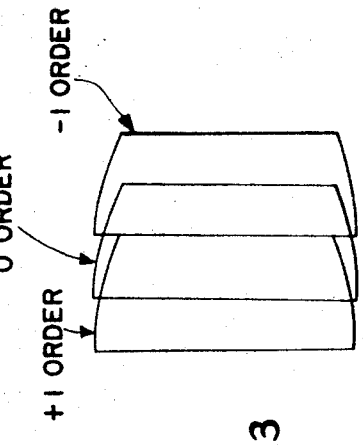
FIG. 3 is a schematic sketch viewed along lines 3—3 of FIG. 1.
Figure 2:
FIG. 2 is a diagrammatic section of the light beam when viewed along lines 2—2 of FIG. 1.

The reflected light rays are received and refocused by a second mirror 17 onto a diffraction grating 19. Diffraction grating 19 is placed near the image of the light source 11. The diffraction grating 19 breaks the light beam into a series of diffracted beams or orders which are reflected by a third mirror 21 onto a suitable screen. Only three of these orders, that is, −1, 0 and +1 are shown in FIG. 3 for the sake of simplicity.

If grating 19 is located at the light source image, the geometrical symmetry of the system is such that the lengths of the paths of all light rays between light source 11 and the grating 19 are nearly equal. Since the light from source 11 is coherent, and if the density throughout the light path is uniform, no fringes (known as the infinite fringe case) will form in the regions of overlap between adjacent orders as observed in FIG. 3. However, if grating 19 is not located at the light source image, the various light paths will not be equal and a pattern of interference fringes (finite fringe case) will exist in the regions of overlap between adjacent orders. The fringe spacing, $b$, can be obtained from the following equation which can be analytically derived from reasoning that is well known in the art:

$$b = \left(\frac{fd}{x}\right)\left[1-(\lambda 2/d^2)\right]^{1/2}$$

where:

$b$ = width of the undisturbed fringe as it would appear in the region between mirrors 13 and 17 and with a magnification factor of 1.
$x$ = distance from grating 19 to source image.

To obtain the infinite fringe pattern, it can be readily seen from this equation that the value of $x$ must be very small (the distance $b$ may be assumed to be greater than $w/2$).

If the density in a portion of the test region indicated in FIG. 4 varies the velocity of the light passing through the disturbed region will be varied, as more clearly shown in FIG. 5, causing a phase shift relative to the light passing through the undisturbed region. This phase shift will be evidenced by the formation of a finite fringe pattern in the overlapping region of adjacent orders in the infinite fringe case or by a shifting of existing fringes in the finite fringe case. The equations for determining the density distribution from an interferogram obtained with the present invention are the same as those obtained for the Mach-Zehnder interferometer. For the infinite fringe setting the interference fringes resulting from a two-dimensional disturbance reperesent lines of constant density, the values of which may be obtained from the following well known general two-dimensional equation:

$$\frac{\rho_1}{\rho_\infty} = \frac{(S_1-S_\infty)\lambda}{L(n-1)}+1$$

where:

$\rho_1$ = density, disturbed region
$\rho_\infty$ = density, undisturbed region
$S_1 - S_\infty$ = number of fringes between disturbed and undisturbed regions
$L$ = length of disturbances measured along light path
$n$ = index of refraction of light in undisturbed region.

If the components of the interferometer are first arranged and adjusted similar to the usual schlieren system, as is well known in the art, it is only necessary to insert the light stop 15 and grating 19 to obtain interference fringes by use of the present invention. In general, the only other adjustments needed are translation motion of the grating 19 to obtain the desired fringe spacing and focusing of the disturbance onto a conventional screen, not shown.

Referring now to FIG. 6, a schematic representation of a typical interferogram of a free jet exhausting against a flat plate taken by the present instrument is shown. The interferometer from which this sketch was taken was obtained with the interferometer adjusted for the infinite fringe pattern. Some of the characteristics of the jet are schematically sketched in the figure.

Studies of this type are particularly useful in fluid dynamic research undertaken to simulate the secondary injection process. This experimental and theoretical investigation permits determination of the actual fluid processes involved in the interaction of secondary gaseous jets with a primary flow and are readily conducted in high speed wind tunnels. As illustrated in FIG. 6, a supersonic jet flow as designated by arrow 61 is exhausted through port 62 in wind tunnel wall 63 against a flat plate 64. In the central core of the jet, prior to the jet strong shock, the flow is isentropic and detectable interference fringes representing individual lines of constant Mach number would be obtained in the interferogram. The flow on the jet center line, after passing through the jet strong shock stagnates on plate 64 and then re-expands to supersonic velocities on either side as indicated by the arrows in FIG. 6. The other general structure of the jet, such as the jet boundaries 65, internal shocks 66, slipstreams 67 and jet strong or reflected shocks 68 are also identified in FIG. 6 and are readily identifiable in interferograms taken with the interferometer of the present invention.

Although the invention has been described more particularly in reference to schlieren systems, it is readily apparent that the use of the laser grating interferometer of the present invention may be used in lieu of conventional interferometers in any system where it may be desirable that the light beam not be divided and then recombined, as is necessary for the usual interferometers using other than a laser light source.

Obviously, many modifications and variations of the present invention are possible in light of the above teachings.

What is claimed as new and desired to be secured by Letters Patent of the United States is:

1. An interferometer comprising a coherent, monochromatic laser light source, perforate stop means interrupting part of the divergent light from said source while permitting part of the divergent light to pass therethrough, first reflecting means reflecting the light that passes through said stop means, means for disturbing and thereby varying the density of a portion of the light reflected by said first reflecting means, second reflecting means receiving and focusing the disturbed and undisturbed portions of said reflected light onto a diffraction grating, said diffraction grating being disposed near the image of said light source, and serving to break the disturbed and undisturbed light beams into a series of overlapping diffracted orders so as to form detectable interference fringes where said orders overlap.

2. The interferometer of claim 1 wherein said diffraction grating is disposed at the light source image whereby the combining beams result in infinite interference fringes.

3. The interferometer of claim 1 wherein said diffraction grating is disposed away from the light source image to thereby change the distance of the light rays in both said disturbed and undisturbed beams from the principal optical axis and result in the two beams combining at a small angle and produce finite interference fringes.

4. The interferometer of claim 2 wherein said infinite fringes result from a two dimensional disturbance and represent lines of constant density, said line density being obtained from the two dimensional equation:

$$\frac{\rho_1}{\rho_\infty} = \frac{(S_1-S_\infty)\lambda}{L(n-1)}+1$$

where $\rho_1$ and $\rho_\infty$, respectively, represent density in the disturbed and undisturbed condition; $S_1$ is the number of fringes between two conditions in the disturbed condition; $S_\infty$ is the number of fringes between two conditions in the undisturbed condition; $\lambda$ is the wavelength of light in a vacuum; $L$ is the length of disturbance; and $n$ is the index of refraction of light in the undisturbed area.

5. The interferometer of claim 1 wherein the width (W) of said light beam is approximately $$W = 2f \tan \theta$$

where $f$ = focal length of said first reflecting means and
$\theta$ = the angle of diffraction of said light beam as obtained from the grating equation $$\theta = \sin^{-1}(\lambda/d) \text{ and where}$$

$\lambda$ = the wavelength of the light in a vacuum and
$d$ = the grating constant.

6. The interferometer of claim 1 wherein the fringe spacing ($b$) may be analytically derived from the formula:

$$b = (fd/x)[1-(\lambda^2/d^2)]^{1/2}$$

where:

$b$ = width of the undisturbed fringe as it would appear in the disturbance region with a magnification of one,
$f$ = focal length of said first reflecting means,
$d$ = grating constant (with of transparent and opaque intervals) and,
$\lambda$ = wavelength of the source light beam in a vacuum.

References Cited

UNITED STATES PATENTS

| | | |
|---|---|---|
| 3,122,601 | 2/1964 | Williams. |
| 3,302,027 | 1/1967 | Fried et al. |
| 3,354,311 | 11/1967 | Vali et al. |

OTHER REFERENCES

Holder, D. W. and North, R. J., "Schlieren Methods," National Physical Laboratory Notes on Applied Science No. 31, (London) 1963, pp. 4, 19, 23, 24, 29 and 30 relied upon. Copy in Group 250.

JEWELL H. PEDERSEN, Primary Examiner

T. MAJOR, Assistant Examiner

U.S. Cl. X.R.

356—129